United States Patent
Sasaki

(10) Patent No.: US 9,533,361 B2
(45) Date of Patent: Jan. 3, 2017

(54) CUTTING MACHINES

(71) Applicant: MAKITA CORPORATION, Anjo-shi, Aichi (JP)

(72) Inventor: Katsuhiko Sasaki, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 211 days.

(21) Appl. No.: 14/157,144

(22) Filed: Jan. 16, 2014

(65) Prior Publication Data

US 2014/0202297 A1 Jul. 24, 2014

(30) Foreign Application Priority Data

Jan. 21, 2013 (JP) .................................. 2013-008217

(51) Int. Cl.
*B23D 45/04* (2006.01)
*B27B 5/29* (2006.01)

(52) U.S. Cl.
CPC ............ *B23D 45/044* (2013.01); *B23D 45/04* (2013.01); *B23D 45/048* (2013.01); *B27B 5/29* (2013.01); *Y10T 83/7697* (2015.04)

(58) Field of Classification Search
CPC ..... B23D 45/048; B23D 45/044; B23D 45/04; B23Q 1/68; Y10T 225/238; Y10T 83/7697
USPC .... 83/473, 581, 471.1–471.3, 477, 485, 490
See application file for complete search history.

(56) References Cited

U.S. PATENT DOCUMENTS

| 5,437,214 | A | 8/1995 | Sasaki et al. | |
|---|---|---|---|---|
| 5,823,085 | A | 10/1998 | Kondo et al. | |
| 5,870,939 | A * | 2/1999 | Matsubara | B23D 45/048 83/471.3 |
| 8,359,959 | B2 * | 1/2013 | Aoyama | B23D 45/048 83/471.3 |
| 2009/0173200 | A1 * | 7/2009 | Aoyama | B23D 45/048 83/471.3 |
| 2009/0205474 | A1 * | 8/2009 | Liu | B23D 45/044 83/435.13 |
| 2009/0315237 | A1 * | 12/2009 | Thomas | B23D 45/048 269/63 |
| 2011/0041666 | A1 | 2/2011 | Aoyama | |

(Continued)

FOREIGN PATENT DOCUMENTS

JP A-5-318402 12/1993
JP A-8-192401 7/1996
(Continued)

*Primary Examiner* — Kenneth E. Peterson
*Assistant Examiner* — Nhat Chieu Do
(74) *Attorney, Agent, or Firm* — Oliff PLC

(57) ABSTRACT

A cutting machine may include a table configured to place thereon a workpiece to be cut, a cutting unit having a cutter and tiltable relative to the table, and a position determining mechanism operable for determining a position of the cutting unit at a plurality of set positions including a vertical position and a plurality of tilt positions where the cutting unit is tilted from the vertical direction. The position determining mechanism may include an operation member operable by a user, and a switching device couple to the operation member and configured to switch the position of the cutting unit to be determined between the plurality of set positions according to the operation of the operation member.

4 Claims, 13 Drawing Sheets

(56) References Cited

U.S. PATENT DOCUMENTS

2013/0160628 A1\* 6/2013 Chiu ..................... B23D 47/02
83/471.3

FOREIGN PATENT DOCUMENTS

| JP | A-9-99401 | 4/1997 |
| JP | A-2009-184101 | 8/2009 |
| JP | A-2011-41999 | 3/2011 |

\* cited by examiner

CUTTING MACHINES

This application claims priority to Japanese patent application serial number 2013-008217, the contents of which are incorporated herein by reference.

BACKGROUND OF THE INVENTION

Field of the Invention

Embodiments of the present invention relate to cutting machines having a cutting unit that may include a cutter, such as a circular grinding wheel or a circular saw blade, and may be moved downwardly for cutting a workpiece.

Known cutting machines may include a table having an upper surface on which a workpiece is placed, and a cutting unit supported on the upper side of the table which can move vertically for cutting the workpiece. More specifically, the cutting unit may have a rotary cutter and may move downward while the rotary cutter rotates, so that the rotary cutter may cut into the workpiece. The workpiece may be fixed relative to the table so as to extend across a region on the upper side of the table.

Known cutting machines used mainly for cutting wood may include a turntable that is rotatable within a horizontal plane. Because a cutting unit is supported on the table, the cutting unit may rotate together with the turntable within a horizontal plane to change its orientation as the turntable rotates by a desired angle. Therefore, the orientation of the rotary cutter of the cutting machine may be changed by the desired angle within the horizontal plane, so that it is possible to perform a so-called "miter cut operation."

In addition, some of the known cutting machines used mainly for cutting wood may be used in an oblique cut operation with the cutting unit laterally inclined in addition to being used in the miter cut operation. In order to perform the oblique cut operation, the cutting unit may be inclined to the left or right by a desired angle as seen from the side of the user and may be moved downward toward the upper surface of the workpiece, so that the workpiece may be obliquely cut with respect to the direction of the thickness of the workpiece. The rotational axis of the rotary cutter may be inclined relative to the upper surface of the table during the oblique cut operation, while the rotational axis of the rotary cutter may be parallel to the upper surface of the table during the miter cut operation.

In order to facilitate the oblique cutting operation, it may be preferable that the cutting unit can be quickly and accurately positioned at a vertical cutting position. At the vertical cutting position, the cutting unit is not inclined from the vertical position. At a left or right tilt position, the cutting unit is tilted left or right from the vertical position. The techniques relating to this positioning of the cutting unit are disclosed, for example, in Japanese Laid-Open Patent Publication No. 2009-184101 and U.S. Pat. No. 8,490,528 (also published as Japanese Laid-Open Patent Publication No. 2011-41999).

Japanese Laid-Open Patent Publication No. 2009-184101 and U.S. Pat. No. 8,490,528 noted above discloses a positioning mechanism that may mainly include a base portion (stationary side) fixed to the table and a tilt portion (tilting side) rotatably joined to the base portion via a tilt support shaft extending in a horizontal direction. In this way, the tilt portion can rotate relative to the base portion within a given angular range. The positioning mechanism may include a so-called "positive stop mechanism", in which a stopper member is provided on one of the base portion or the tilting portion that supports the cutting unit. A stop projection is provided on the other of the base portion or the tilt portion. In this way, the cutting unit can be positioned at the left or right tilt position in addition to the vertical position. The positive stop mechanism allows the user to quickly accurately position the cutting unit at the vertical position or the left or right tilt position without need of visual observation of an angular scale.

However, the positive stop mechanism still needs to be improved in terms of operability. For example, in the case of the techniques disclosed in the above documents, in order to tilt the cutting unit to the left or right tilt position, it is necessary to operate two separate operation members. One is used for moving a first switching member in changing between a vertical position and a rest position, and the other for switching between different tilt angles. In this way, two operation members are necessary to be operated in order to tilt the cutting unit to the left or right tilt position. Therefore, the operation of the positive stop mechanism disclosed in the above documents is rather troublesome, and it has been desired to improve the operability of the cutting device in terms of the operation for tilting the cutting unit left or right as seen from the side of the user.

SUMMARY OF THE INVENTION

In one aspect according to the present teachings, a cutting machine may include a table configured to place thereon a workpiece to be cut, a cutting unit having a cutter and being tiltable relative to the table, and a position determining mechanism for determining a position of the cutting unit at a plurality of set positions including a vertical position and a plurality of tilt positions where the cutting unit is tilted from the vertical direction. The position determining mechanism may include an operation member operable by a user, and a switching device couple to the operation member and configured to switch the position of the cutting unit. The position can be switched between the plurality of set positions according to the operation of the operation member.

DETAILED DESCRIPTION OF THE INVENTION

Figure 1:
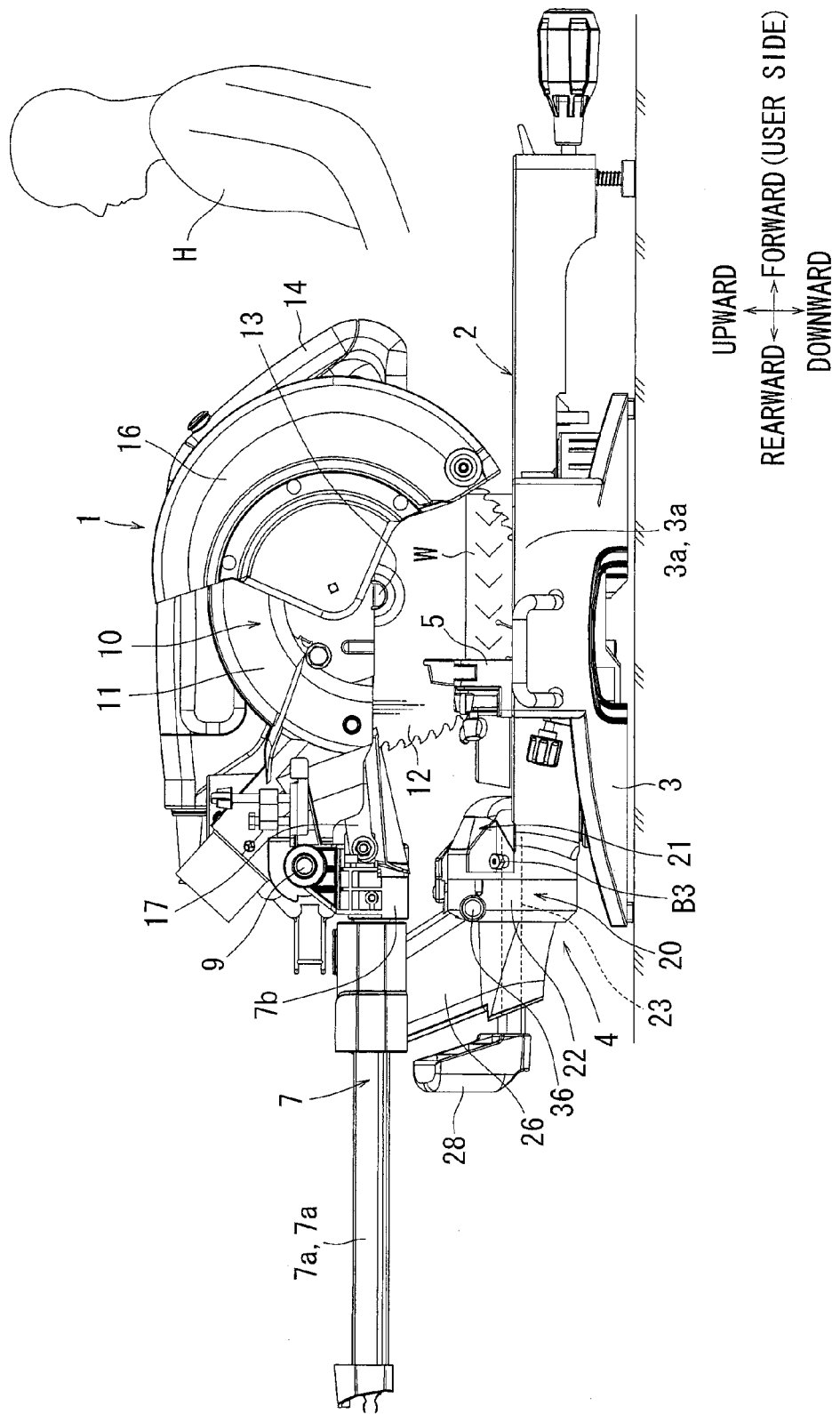
FIG. 1 is a side view of a cutting machine according to a first embodiment showing a cutting unit positioned at its lowermost position.
Figure 2:
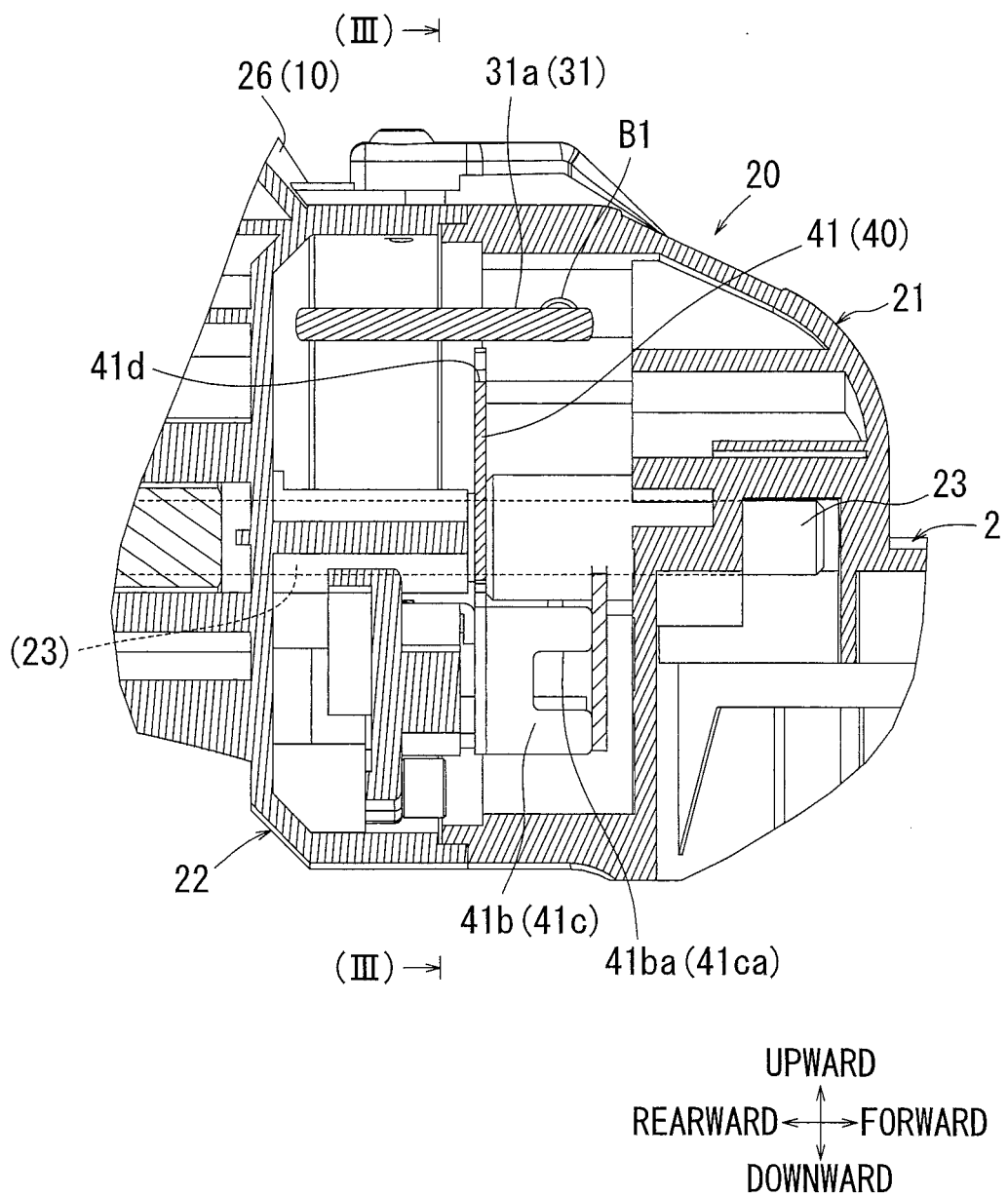
FIG. 2 is a vertical sectional view of a unit support of the cutting machine.

Each of the additional features and teachings disclosed above and below may be utilized separately or in conjunction with other features and teachings to provide improved cutting machines. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one embodiment, a cutting machine may include a table for placing thereon a workpiece to be cut, a cutting unit having a cutter and supported on an upper side of the table, a stopper device, and a position determining mechanism configured to cooperate with the stopper device for determining a position of the cutting unit at least four set positions. The at least four set positions include a vertical position and at least three tilt positions where the cutting unit is tilted at different tilt angles in at least one of left and right directions from the vertical position. The position determining mechanism may include a single operation member movable in one direction and configured to switch the determined position of the cutting unit between the at least four set positions in accordance with the position of the operation member along the one direction.

With this arrangement, the tilt position of the cutting unit can be switched by operating the operation member, which is a single member, in one direction. Therefore, in comparison with the known cutting machine that needs to operate two separate operation members (one for moving a first switching member determining the vertical position to a rest position and the other for switching between different tilt angles), it is possible to improve the operability and the usability of the cutting machine.

The tilt angles of the cutting unit at the at least three tilt positions may include at least two tilt angles in at least one of the left and right directions. Therefore, in addition to the vertical position, it is possible to position the cutting unit at three tilt positions that may be, for example, a left 45° position, a left 48° position and a right 5° position. It may be also possible to position the cutting unit at four tilt positions that may be, for example, left and right 45° positions and left and right 48° positions.

The position determining mechanism may include a first switching member and a second switching member. The first switching member may be movable between an operational position for determining the vertical position of the cutting unit and a rest position spaced from the operational position. The operation member may be operable to move the first switching member from the operational position to the rest position. The second switching member may be movable in response to the movement of the first switching member. The second switching member may move towards the rest position through a releasing operation of the operation member so that the tilt angles can be adjusted.

With this arrangement, when the operation member is operated in one direction, the positioning of the cutting unit at the vertical position is released. In conjunction with the operation of the operation member, the second switching member may be moved to automatically switch the tilt position.

The first switching member may move along a circular arc path by the releasing operation of the operation member, and the second operation member may move along a linear path by the pivot movement of the first switching member. Therefore, as the releasing operation of the operation member is performed, the first switching is moved to its operational position, so that the positioning of the cutting unit at the vertical position can be released. As the first switching member moves from its operational position along the circular arc path, the second switching member may move along the linear path, so that the tilt position to be determined can be changed. The operation member may move along a linear path.

The at least three tilt positions may include a first tilt position and a second tilt position where the cutting unit is tilted at a first tilt angle and a second tilt angle, respectively. The stopper device may include a stopper member. The first tilt position may be determined through abutment between the stopper member and the second switching member. The position determining device may further include a position determining member that is a separate member from the second switching member. The second tilt position may be determined through abutment between the stopper member and the position determining member.

With this arrangement, as the second switching member moves along the linear path, it may be possible to switch between the state where the second switching member and the stopper member abut each other and the state where the stopper member does not abut the second switching member but abuts the position determining member that is a separate member from the second switching member. In this way, the tilt angle of the cutting unit to be determined can be switched.

In another embodiment, a cutting machine may include a table configured to place thereon a workpiece to be cut, a cutting unit having a cutter and being tiltable relative to the table, a stopper device, and a position determining mechanism configured to cooperate with the stopper device for determining a position of the cutting unit at a plurality of set positions including a vertical position and a plurality of tilt positions where the cutting unit is tilted from the vertical direction. The position determining mechanism may include an operation member movable along a first path, a first switching member movable along a second path and operable to determine the vertical position, and a second switching member movable along a third path and operable to determine the plurality of tilt positions. The first switching member and the second switching member respectively move along the second path and the third path as the operation member moves along the first path.

The first path, the second path and the third path may be different from each other. The operation member may move the first switching member, and the first switching member may move the second switching member.

Embodiments of the present invention will now be described with reference to FIGS. 1 to 13.

<First Embodiment>

A first embodiment will be described with reference to FIGS. 1 to 7. As shown in FIG. 1, a cutting machine 1 according to the first embodiment may generally include a table 2, a base 3, a unit support 4 and a cutting unit 10. A workpiece W may be fixed in position on an upper surface of the table 2. The base 3 may support the table 2 to allow rotation of the table 2 within a given angular range within a horizontal plane. The unit support 4 may be disposed at the rear portion (left end portion as viewed in FIG. 1) of the table 2. The cutting unit 10 may be supported by the unit support 4 at a position on the upper side of the table 2. In order to operate the cutting machine 1, a user H may be positioned on the right side of the cutting machine 1 as viewed in FIG. 1. In this specification, the forward and rearward directions, the leftward and rightward directions and the upward and downward directions are determined with reference to the position of the user H who operates the cutting machine 1. These directions are also indicated in the drawings. Regarding FIGS. 3 to 7, these figures show views as viewed from the rear side, and therefore, the left and the right directions are opposite to those as seen from the front side of the sheets of these figures.

A positioning fence 5 for positioning the workpiece W within a plane of the upper surface of the table 2 may extend along the upper surface of the table 2. More specifically, the positioning fence 5 may be mounted to a pair of auxiliary tables 3a disposed on the left and right sides of the base 3, so that the positioning fence 5 may extend between the pair of auxiliary tables 3a. A slight gap may be provided between the positioning fence 5 and the upper surface of the table 2, so that the table 2 can rotate within the horizontal plane without being interfered by the positioning fence 5. After being positioned by the positioning fence 5, the workpiece W may be fixed in position against the upper surface of the table 2 by using a clamp device (not shown).

The unit support 4 may include a slide support 7 and a tilt support 20. The slide support 4 may support the cutting unit 10 such that the cutting unit 10 can slide in the forward and rearward directions (left and right directions as viewed in FIG. 1) relative to the table 2. The tilt support 7 may support the cutting unit 10 such that the cutting unit 10 can tilt left or right (in a direction perpendicular to the sheet of FIG. 1) within a given angular range. More specifically, the tilt support 7 has a support arm 26 having an upper portion on which the cutting unit 10 is supported via the slide support 7. The slide support 7 may include a pair of slide bars 7a extending parallel to each other and spaced apart from each other by a given distance. The front ends of the pair of slide bars 7a are connected to each other by a holder 7b. The cutting unit 10 may be vertically tiltably supported on the holder 7b via a tilt support shaft 9. The slide support 7 may allow the cutting unit 10 to slide in the direction of the cutting of the cutting unit 10. Normally, the cutting unit 10 may be slid backwards (leftward as viewed in FIG. 1) in order to cut the workpiece W.

The cutting unit 10 may include a unit case 11. The unit case 11 may have a rear portion that is tiltably supported by the holder 7b of the slide support 7 via the tilt support shaft 9. The unit case 11 may cover substantially an upper circumferential half of a circular rotary cutter 12. The rotary cutter 12 may rotate in a clockwise direction as viewed in FIG. 1. The rotary cutter 12 may be mounted to a spindle 13 that is rotatably supported by the unit case 11. The spindle 13 may be rotatably driven by an electric motor (not shown) via a reduction gear train. The electric motor may be mounted to the backside (left side as viewed from the user H) of the unit case 11. The rotational axis of the spindle 13 may coincide with the rotational axis of the rotary cutter 12.

A handle 14 capable of being grasped by the user H may be provided on the backside of the unit case 11. While the user H grasps the handle 14, he or she can pull a trigger-type switch lever (not shown) with his or her finger to start the electric motor for rotating the rotary cutter 12. In addition, while the user H grasps the handle 14, he or she can pivot the cutting unit 10 downward about the tilt support shaft 9 by moving the handle 14. In this way, the rotary cutter 12 may cut into the workpiece W as the rotary cutter 12 rotates. A substantially lower circumferential half of the rotary cutter 12 may be covered by a movable cover 16. FIGS. 1 shows a substantially fully opened position of the movable cover 16. The movable cover 16 may be rotatably supported by the unit case 11 via a support shaft (not shown) that is substantially parallel to the spindle 13. In this way, the movable cover 16 can rotate in the vertical direction about the support shaft. The movable cover 16 may be interlocked with a link lever 17 that is pivotally supported by the holder 7b. In this way, the movable cover 16 can be opened and closed in response to the vertical movement of the cutting unit 10.

FIGS. 2 to 7 show the details of the tilt support 20. The tilt support 20 may include a base portion 21 and a tiltable portion 22 each having a substantially circular cup-shape. The base portion 21 may be integrally formed with the rear portion of the table 2.

The tiltable portion 22 may be connected to the base portion 21 via a tilt support shaft 23, so that the tiltable portion 22 can rotate relative to the base portion 21 about the axis of the tilt support shaft 23. The support arm 26 may be formed integrally with the upper portion of the tiltable portion 22 to extend upward therefrom. Therefore, the cutting unit 10 can tilt leftward and rightward as the tiltable portion 22 rotates relative to the base portion 21 about the tilt support shaft 23.

The rear end portion of the tilt support shaft 23 may have a threaded shaft portion. A fixing lever 28 may be threadably engaged with the threaded shaft portion, so that the fixing lever 28 can rotate about the tilt support shaft 23. Rotating the fixing lever 28 in a tightening direction may fix the tiltable portion 22 against the base portion 21. In this way, the left or right tilt position of the cutting unit 10 can be fixed. Conversely, rotating the fixing lever 28 in a loosening direction opposite to the tightening direction may allow the tiltable portion 22 to rotate left or right relative the base portion 21. In this way, the left or right tilt position of the cutting unit 10 can be changed.

In this embodiment, the tilt position of the tiltable portion 22 relative to be base portion 21, i.e., the left or right tilt position of the cutting unit 10 from a vertical position (0° tilt position), can be selectively chosen from three different tilt angle positions. More specifically, in this embodiment, the cutting unit 10 can be positioned at any one of three different tilt positions including a left 45° tilt position, a left 48° tilt position and a right 5° tilt position.

The vertical position of the cutting unit 10 is a position for performing a vertical cutting operation of the workpiece W. When the cutting unit 10 is at the vertical position, the rotational axis of the rotary cutter 12 (i.e., the rotational axis of the spindle 13) may extend parallel to the upper surface of the table 2, so that the surface of the rotary cutter 12 may extend perpendicular to the upper surface of the table 2. The vertical cutting position may be most frequently used in this kind of cutting machine. The vertical cutting position can be determined by a vertical position determining device 30.

Figure 3:
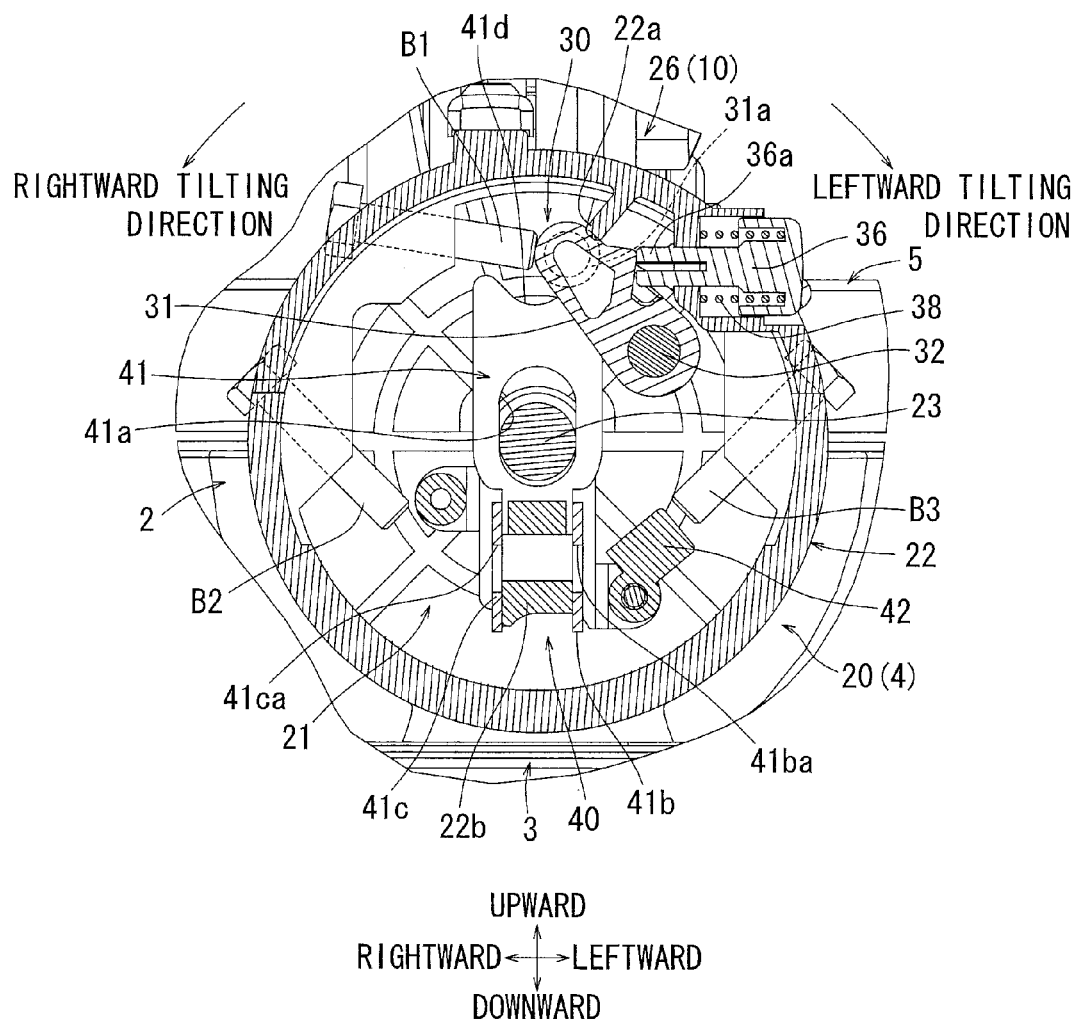
FIG. 3 is a vertical sectional view of the unit support as viewed from the rear side, with the elements of the unit support shown such that the left and right directions of the elements are opposite to the left and right directions as viewed from the front side the sheet of FIG. 3, and showing the state where the cutting unit is positioned at a vertical position.

Referring to FIG. 3, the vertical position determining device 30 may include a first switching member 31. The first switching member 31 may be pivotally supported within the tiltable portion 22 via a support shaft 32. The support shaft 32 may extend parallel to the tilt support shaft 23. A cylindrical contact portion 31a may be disposed at the radially outer end portion of the first switching member 31 so as to extend forwardly into the base portion 21.

A torsion coil spring (not shown) may bias the first switching member 31 in a clockwise direction as viewed in FIG. 3. The torsion coil spring may hold the first switching member 31 at a position determining position where the contact portion 31a used for determining the vertical cutting position contacts a positioning wall portion 22a provided on the inner circumferential wall of the tiltable portion 22.

As shown in FIG. 3, a first stopper member B1 used for determining the vertical cutting position may be disposed at the upper right part of the base portion 21. The first stopper member B1 may extend from the outside to the inside of the base portion 21 and through the base portion 21, so that the end portion of the first stopper member B1 may be positioned within the base portion 21. The first stopper member B1 may be a bolt or a screw. When the first switching member 31 is at the position determining position where the contact portion 31a contacts the positioning wall portion 22a, the first stopper member B1 may contact the contact portion 31a, so that the cutting unit 10 can be positioned at the vertical position. In this state, the cutting unit 10 can be fixed at the vertical position by rotating the fixing lever 28 in the tightening direction for fixing the tiltable support 22 against the base portion 21.

The first switching member 31 may be in a position determining position where the contact portion 31a of the first switching member 31 is held in contact with the positioning wall portion 22a of the tiltable portion 22 by the biasing force of the torsion coil spring. Here, the cutting unit 10 can be tilted leftward but cannot be tilted rightward. In order to tilt the cutting unit 10 rightward, it is necessary to pivot the first switching member 31 against the biasing force of the torsion coil spring in a counterclockwise direction from the position determining position to a rest position shown in FIG. 4. Here, the contact portion 31a is spaced from the positioning wall portion 22.

Figure 7:
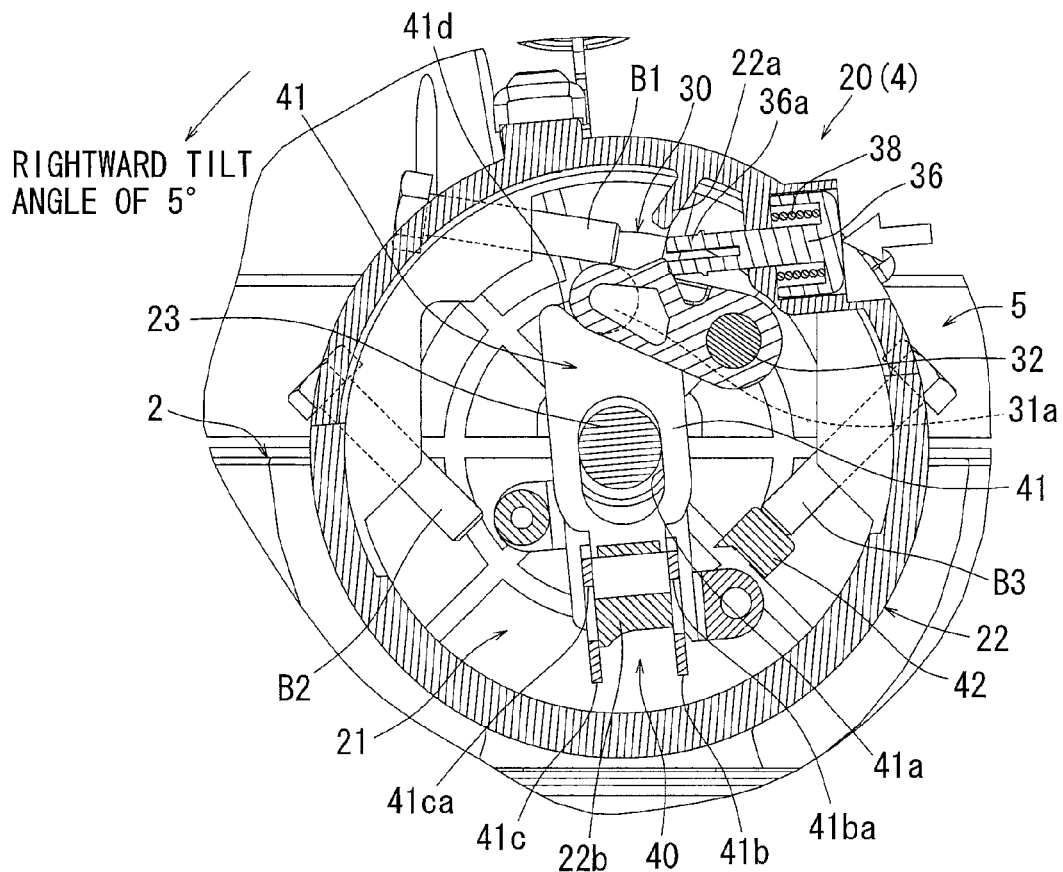
FIG. 7 is a view similar to FIG. 3 but showing the state where the cutting unit is positioned at a right 5° tilt position.

Pushing an operation member 36 disposed at the left side part of the tiltable portion 22 can move the first switching member 31 to the rest position. The operation member 36 may have an operation shaft 36a. The operation member 36 may be supported by the left side part of the tiltable portion 22 via the operation shaft 36a so as to be movable in the axial direction of the operation shaft 36a. The operation shaft 36a may extend into the tiltable portion 22, so that the front end of the operation shaft 36a may be oriented toward the lateral surface of the first switching member 31. A compression coil spring 38 may hold the operation member 36 at a position where the front end of the operation shaft 36a contacts the lateral surface of the first switching member 31. Pushing the operation member 36 rightward against the biasing force of the compression coil spring 38, as indicted by an outline arrow in FIG. 4, may cause the first switching member 31 to move toward the rest position against the biasing force of the torsion coil spring by the operation shaft 36a. As the first switching member 31 moves to the rest position, the contact portion 31a moves to a position whereas not to contact the first stopper member B1. In this way, the tiltable portion 22 can rotate relative to the base portion 21 in a counterclockwise direction from the position shown in FIG. 4. Therefore, the cutting unit 10 can be tilted rightward as shown in FIG. 7. The operation member 36 can automatically return to the initial position shown in FIG. 3 by the biasing force of the compression coil spring 38 when the pushing force applied to the operation member 36 is released.

As the cutting unit 10 tilts leftward to return from the rightward tilt position, the first switching member 31 may automatically return from the rest position to the position determining position by the biasing force of the torsion coil spring at the time when the cutting unit 10 passes the vertical position. Therefore, tilting the cutting unit 10 rightward, again, after passing the vertical cutting position may cause the contact portion 31a of the first switching member 31 to contact both the positioning wall portion 22a and the first stopper member B1. In this way, the cutting unit 10 can be accurately positioned at the vertical cutting position.

The protruding distance of the first stopper member B1 into the base portion 21 can be adjusted from the outside of the base portion 21 by rotating the first stopper member B1. By adjusting the protruding distance of the first topper member B1, it is possible to precisely adjust the vertical position of the cutting unit 10.

In addition to the vertical position determining device 30, the cutting unit 10 may further include a tilt position determining device 40 for determining the left 45° tilt position, the left 48° tilt position and the right 5° tilt position.

The tilt position determining device 40 may include a second stopper member B2, a third stopper member B3 and a second switching member 41. In FIG. 3, the second stopper member B2 positioned on the left side may determine the left 45° tilt position and the left 48° tilt position. The third stopper member B3 positioned on the right side may determine the right 5° tilt position. Similar to the first stopper member B1, the second and third stopper members B2 and B3 may be bolts or screws.

The second switching member 41 may extend between the tilt support shaft 23 and a support base 22b so as to be movable in the vertical direction. The support base 22b may be disposed within the tiltable portion 22 and may be formed integrally with the tiltable portion 22. More specifically, a support hole 41a may be formed in the second switching member 41 at a central position in the longitudinal direction and may be elongated in the longitudinal direction. The tilt support shaft 23 may be inserted into the support hole 41a, so that the second switching member 41 can move in the diametrical direction (vertical direction) relative to the tilt support shaft 23.

The second switching member 41 may include a left switching tab 41b and a right switching tab 41c formed on its lower end and each extending forward in a manner similar to an L-shape. The support base 22b may be positioned between the left and right switching tabs 41b and 41c. The left and right switching tabs 41b and 41c may slidably contact the left and right side surfaces of the support base 22b. In this way, the left and right switching tabs 41b and 41c can move linearly vertically without causing shifting movement in the left or right direction under the guide of the support base 22b.

The second switching member 41 may be biased in a direction vertically upward by a compression spring (not shown). The left switching tab 41b may have a relief hole 41ba formed in the central portion thereof and extending in a thickness direction. Similarly, the right switching tab 41c may have a relief hole 41ca formed in the central portion thereof and extending in a thickness direction.

A substantially semicircular engaging recess 41d may be formed in the upper end of the second switching member 41. As the first switching member 31 moves toward the rest position by the releasing operation (pushing operation) of the operation member 36, the contact portion 31a may enter the engaging recess 41d so as to contact the bottom of the engaging recess 41d. As the first switching member 31 moves further toward the rest position while the contact portion 31a contacting the bottom of the engaging recess 41d, the second switching member 41 may move linearly downward against the biasing force of the compression spring (not shown).

Figure 4:
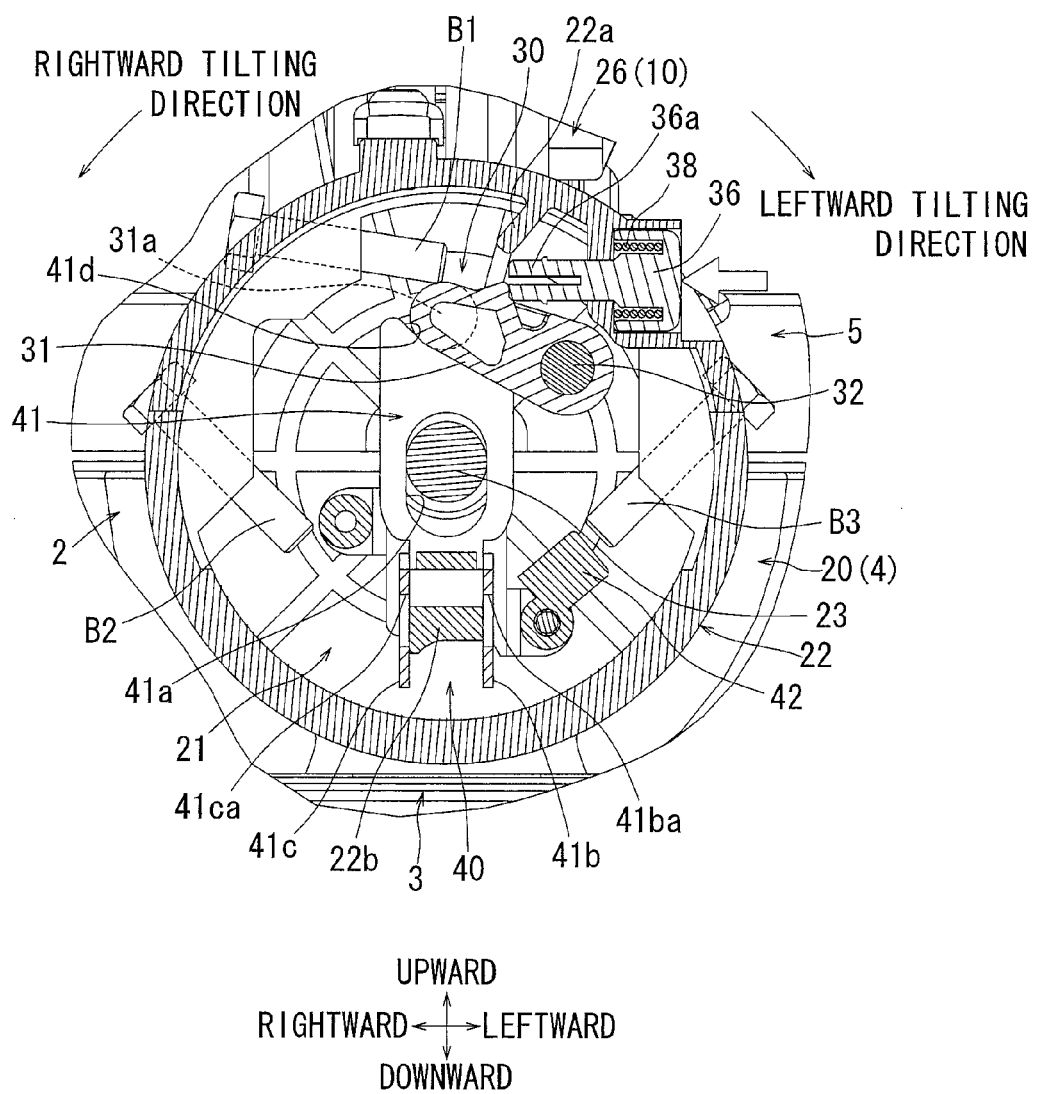
FIG. 4 is a view similar to FIG. 3 but showing the state where a releasing operation of an operation member has been performed.

In this way, when the releasing operation of the operation member 36 is not performed (the state shown in FIG. 3), the second switching member 41 may be held at an upper position (hereinafter also called a first position) by the biasing force of the compression spring. On the other hand, when the releasing operation of the operation member 36 is performed to move the first switching member 31 toward the rest position as shown in FIG. 4, the second switching member 41 may be forced to move to a lower position (hereinafter also called a second position). In this way, the second switching member 41 can move between the upper first position and the lower second position along a linear path. The compression spring (not shown) may normally bias the second switching member 41 toward the first position.

As the second switching member 41 moves linearly between the first position and the second position, the left and right switching tabs 41b and 41c may move vertically, so that the relief holes 41ba and 41ca may also move vertically.

As the right switching tab 41c and its relief hole 41ca of the second switching member 41 moves vertically, it may be possible to determine the position of the cutting unit 10 at the left 45° tilt position and the left 48° tilt position. In this embodiment, the left switching tab 41b is not used for the positioning function. On the left side of the left switching tab 41b, a positioning projection (position determining member) 42 for determining a right tilt position may be located. Similar to the support base 22b of the tiltable portion 22, the positioning projection 42 may be formed integrally with the inner wall of the tiltable portion 22. In the first embodiment, the positioning projection 42 may serve to determine the right 5° tilt position of the cutting unit 10.

Operation of the cutting machine 1 will be now described in connection with tilting the cutting unit 10 leftward and rightward, the vertical position determining mechanism 30, and the tilt position determining mechanism 40.

Figure 5:
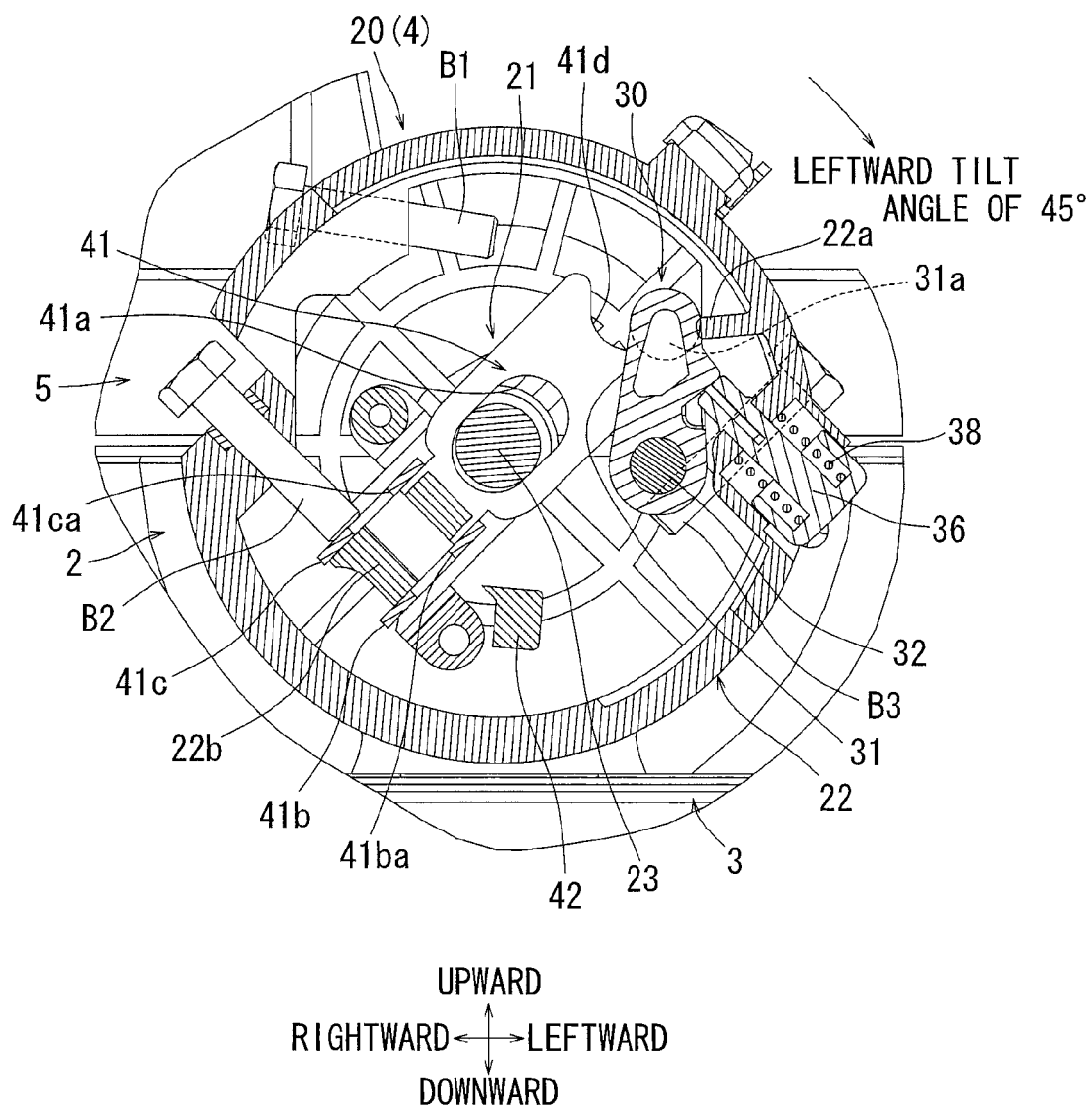
FIG. 5 is a view similar to FIG. 3 but showing the state where the cutting unit is positioned at a left 45° tilt position.

First, the fixing lever 28 may be loosened for permitting the cutting unit 10 to tilt leftward from the vertical position. For this purpose, it is not necessary to perform the releasing operation of the operation member 36. If the releasing operation of the operation member 36 is not performed, the second switching member 41 may be held at the upper first position. As the cutting unit 10 is tilted leftward by an angle of 45°, the second stopper member B2 may abut the right switching tab 41c as shown in FIG. 5. In this way, the cutting unit 10 can be positioned at the left 45° tilt position. After that, the fixing lever 28 may be tightened to fix the cutting unit 10 at the left 45° tilt position.

Figure 6:
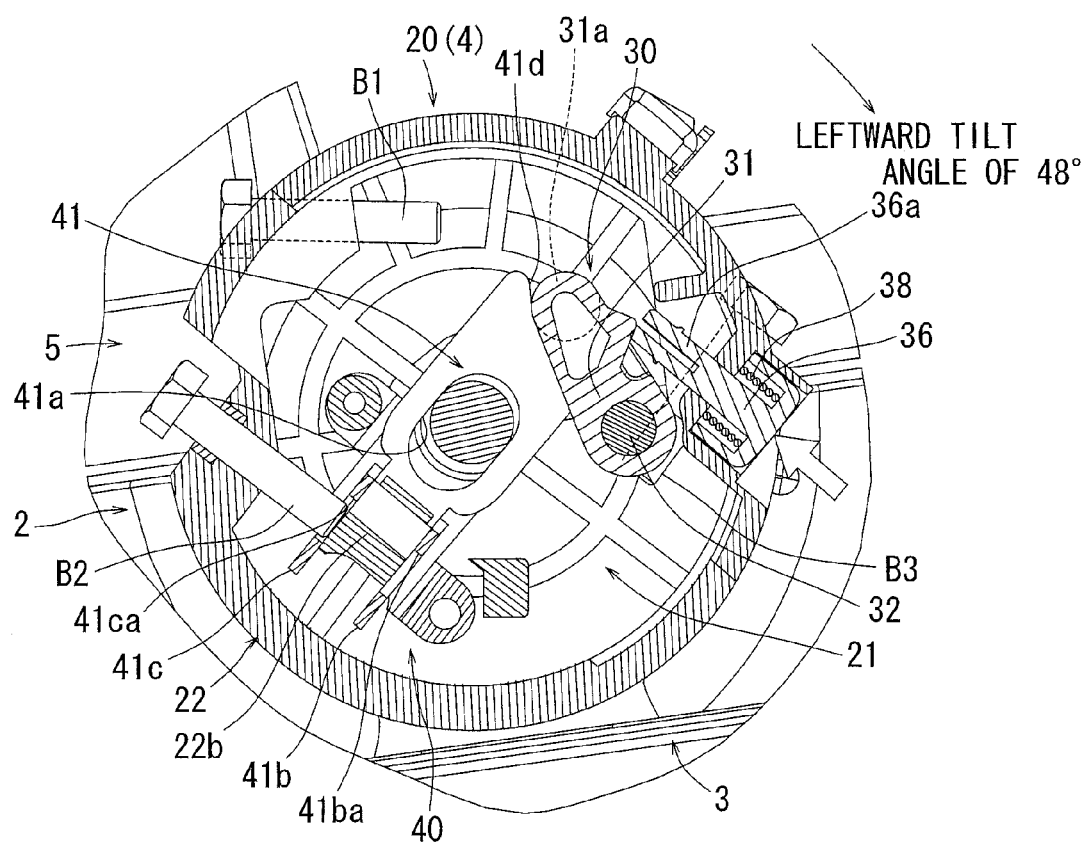
FIG. 6 is a view similar to FIG. 3 but showing the state where the cutting unit is positioned at a left 48° tilt position.

On the other hand, the cutting unit 10 can be tilted leftward to the left 48° tilt position if the fixing lever 28 is loosened and the releasing operation of the operation member 36 is performed. As the releasing operation of the operation member 36 is performed, the first switching member 31 may move to the rest position, so that the second switching member 41 may move linearly to the lower second position as shown in FIG. 6. As the second switching member 41 moves to the second position, the relief hole 41ca of the left switching tab 41c may move downward. If the cutting unit 10 is tilted leftward when the second switching member 41 is at the second position, the front end of the second stopper member B2 may enter the relief hole 41ca and may then directly abut the right side surface of the support base 22b. In this way, the cutting unit 10 can be tilted further beyond the left 45° tilt position by an angle (3° in this embodiment) corresponding to the thickness of the right switching tab 41c until the left 48° tilt position. In other words, the cutting unit 10 can be positioned at the left 48° tilt position due to direct contact of the second stopper member B2 with the right side surface of the support base 22b after passing through the right switching tab 41c. Thereafter, the fixing lever 28 may be tightened to fix the cutting unit 10 at the left 48° tilt position.

The cutting unit 10 can be tilted rightward from the vertical position to the right 5° tilt position if the fixing lever 28 is loosened and the releasing operation of the operation member 36 is performed. As the cutting unit 10 is tilted rightward, the third stopper member B3 may abut the left side surface of the positioning projection 42 when the cutting unit 10 reaches to the right 5° tilt position. In this way, the cutting unit 10 can be positioned at the right 5° tilt position. The cutting unit 10 can be fixed at the right 5° tilt position by tightening the fixing lever 28.

As described above, according to the cutting machine 1 of the first embodiment, the cutting unit 10 can be selectively positioned at the left 45° tilt position or the left 48° tilt position depending on whether the operation member 45, which is operable for releasing the positioning of the cutting unit 10 at the vertical position, is operated for releasing or not. In other words, the operation member 45 operable for releasing the positioning of the cutting unit 10 at the vertical position also has a function of switching the tilt angle. The operation member 45 is a single member. Therefore, in comparison with the construction in which an operation member that is a separated member from an operation member for releasing the vertical position of the cutting unit is necessary to be operated for switching the tilt angle, it is possible to improve the operability of the cutting machine.

<Second Embodiment>

A second embodiment will be described with reference to FIGS. 8 to 13. The second embodiment is a modification of the first embodiment. Therefore, in FIGS. 8 to 13, like members are given the same reference numerals as the first embodiment and the description of these members will not be repeated.

Referring to FIGS. 8 to 13, there is shown the unit support 4 of the cutting machine 1 according to the second embodiment. The tilt support mechanism 20 of the second embodiment is different from that of the first embodiment in that no positioning projection 42 is provided. In the second embodiment, in place of the positioning projection 42, the left switching tab 41 may serve as a positioning member for a right tilt position of the cutting unit 10.

Figure 8:
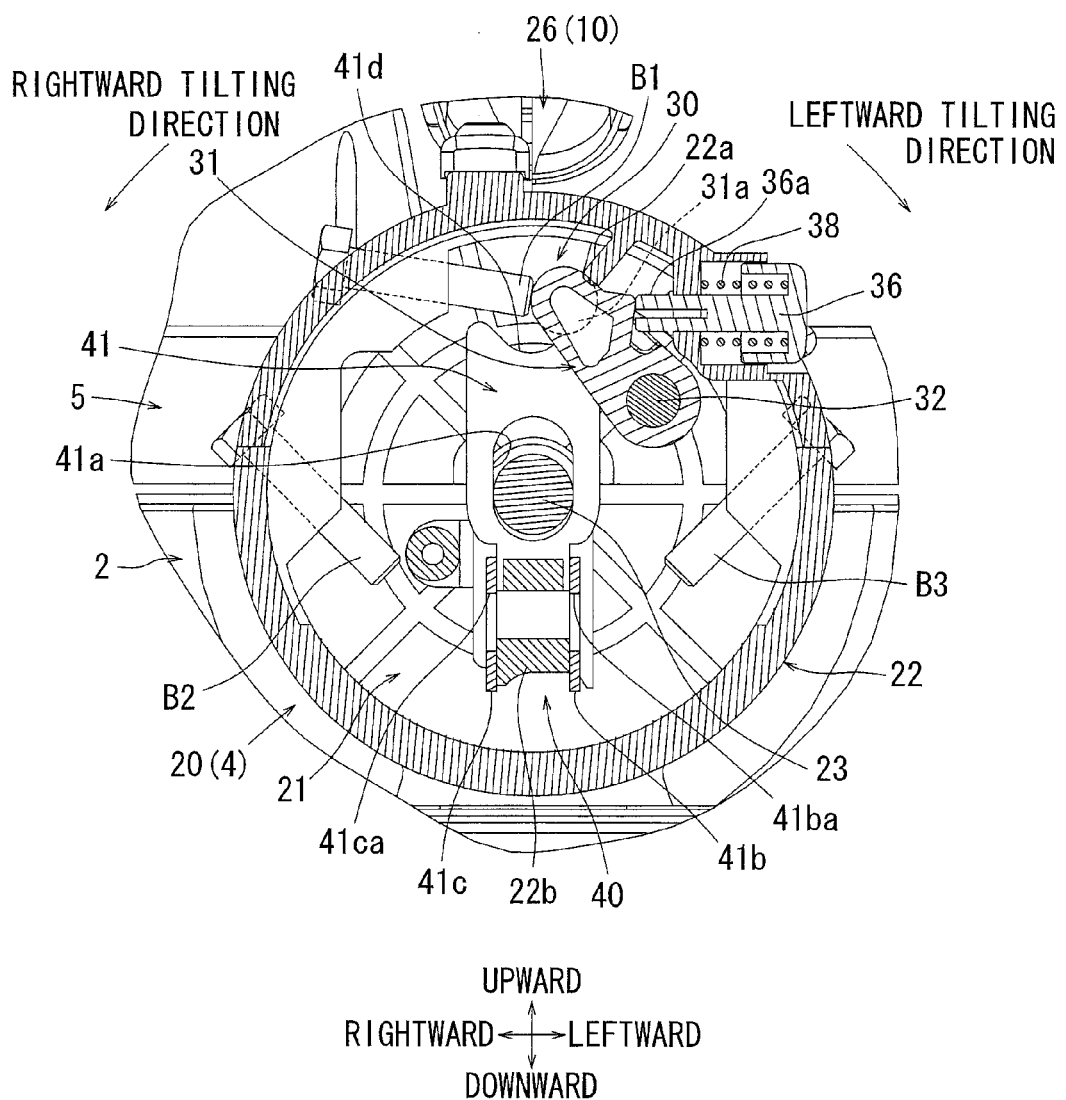
FIG. 8 is a view similar to FIG. 3 but showing a vertical sectional view of a unit support of a cutting machine according to a second embodiment showing the state where the cutting unit is positioned at a vertical position.

FIG. 8 shows the state where the cutting unit 10 is positioned at the vertical position. FIG. 8 is different from FIG. 3 of the first embodiment in that no positioning projection 42 is provided. In other respect, the second embodiment is the same as the first embodiment.

Figure 9:
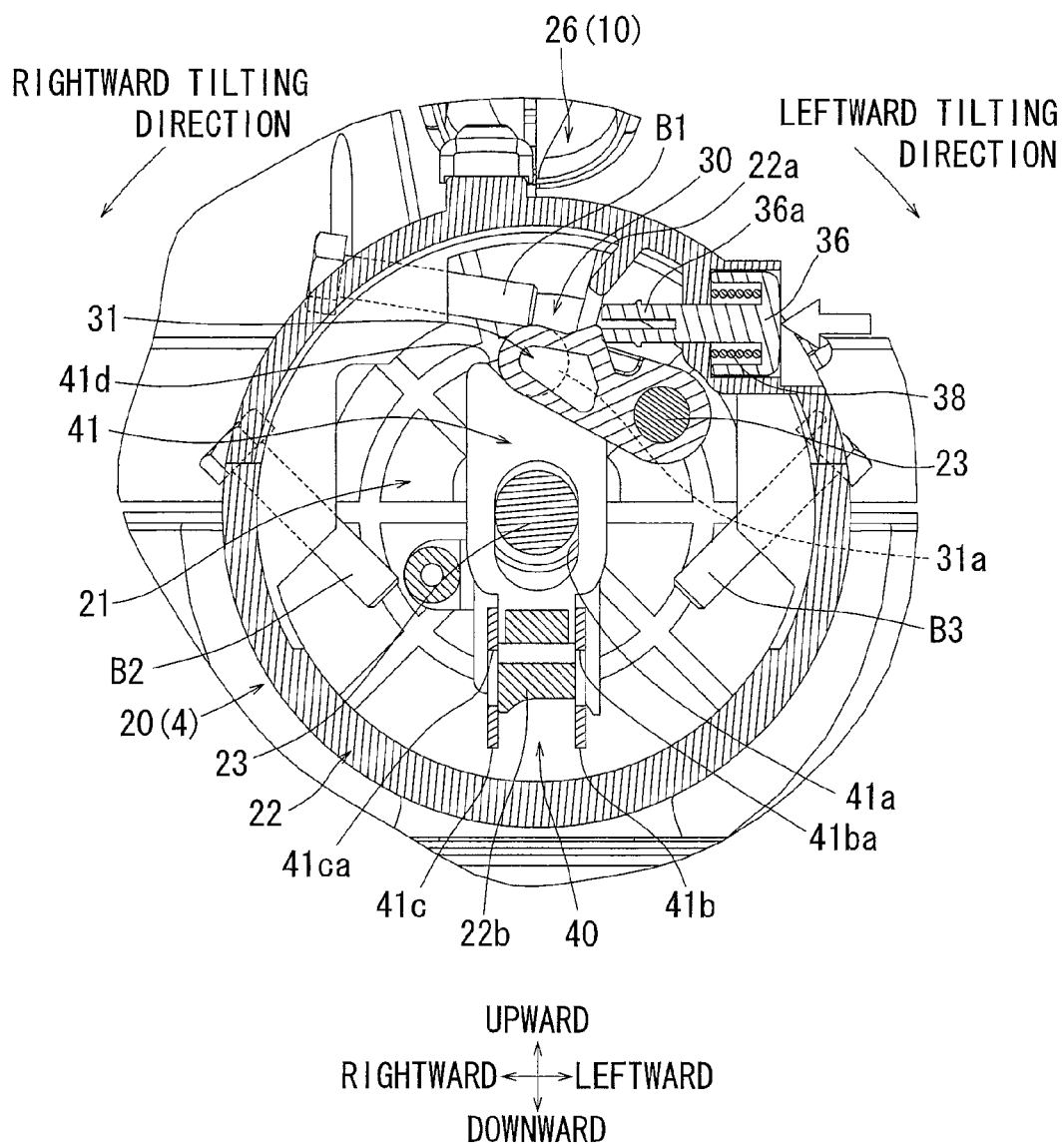
FIG. 9 is a view similar to FIG. 8 but showing the state where a releasing operation of an operation member has been performed.

FIG. 9 shows the state where the cutting unit 10 is positioned at the vertical position while the fixing lever 28 is loosened and the operation member 36 is operated (pushed) to the releasing position. Due to the releasing operation of the operation member 36, the first switching member 31 is pivoted rightward, so that the contact portion 31a of the first switching member 31 is spaced apart from the positioning wall portion 22a of the tiltable portion 22. The state shown in FIG. 9 is the same as the state shown in FIG. 4 of the first embodiment except that no positioning projection 42 is shown.

Figure 10:
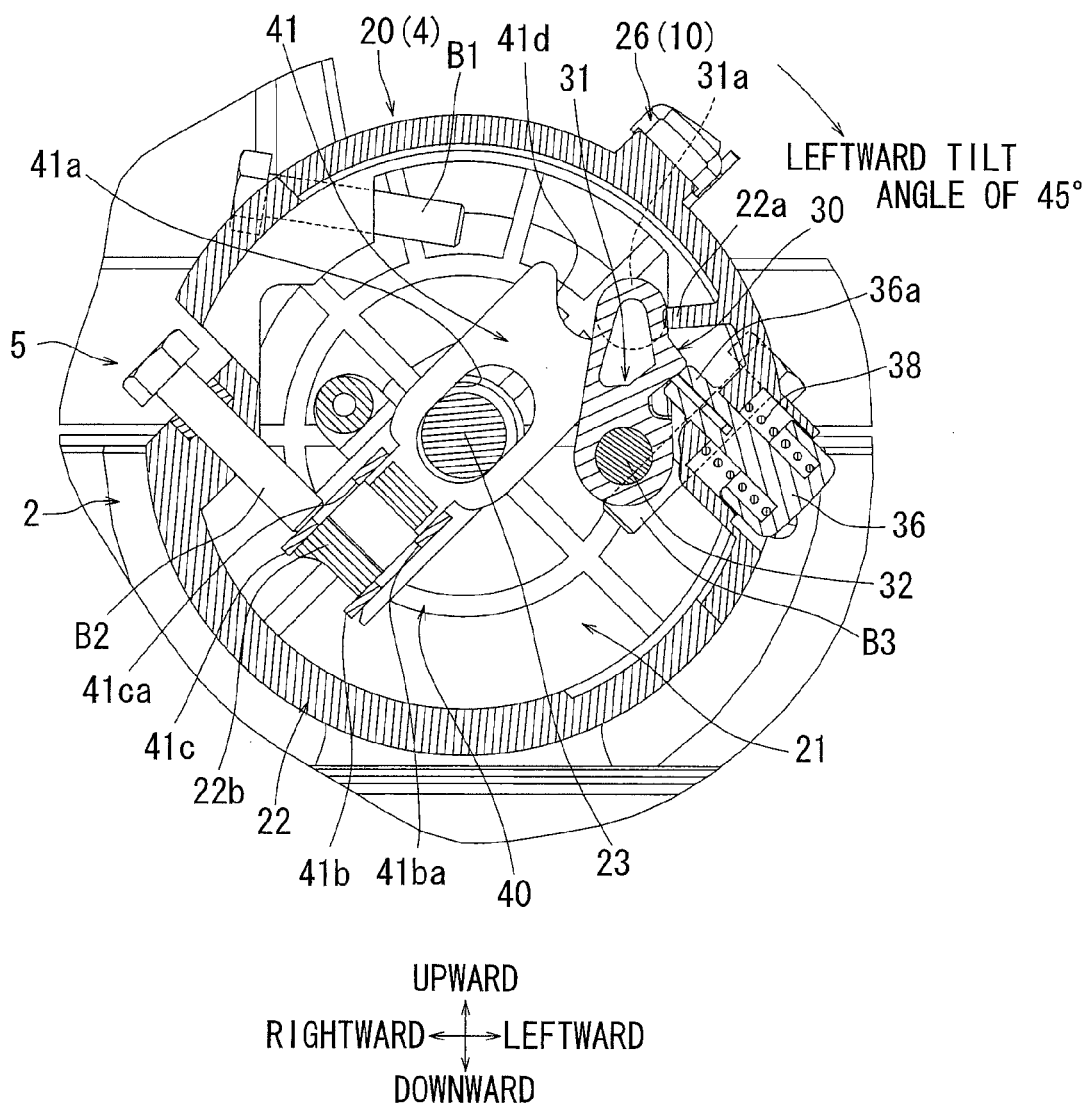
FIG. 10 is a view similar to FIG. 8 but showing the state where the cutting unit is positioned at a left 45° tilt position.

In order to tilt the cutting unit 10 leftward as shown in FIG. 10, it is only necessary to loosen the fixing lever 28. It is not necessary to perform the releasing operation of operation member 36. This is the same as in the case of the first embodiment. When the releasing operation of the operation member 36 is not performed, the second switching member 41 is positioned at the upper first position. Therefore, if the cutting unit 10 is tilted leftward by an angle of 45°, the second stopper member B2 may abut the right switching tab 41c. In this way, the cutting unit 10 can be positioned at the left 45° tilt position. Also, FIG. 10 is different from FIG. 5 of the first embodiment only in that no positioning projection 42 is shown.

Figure 11:
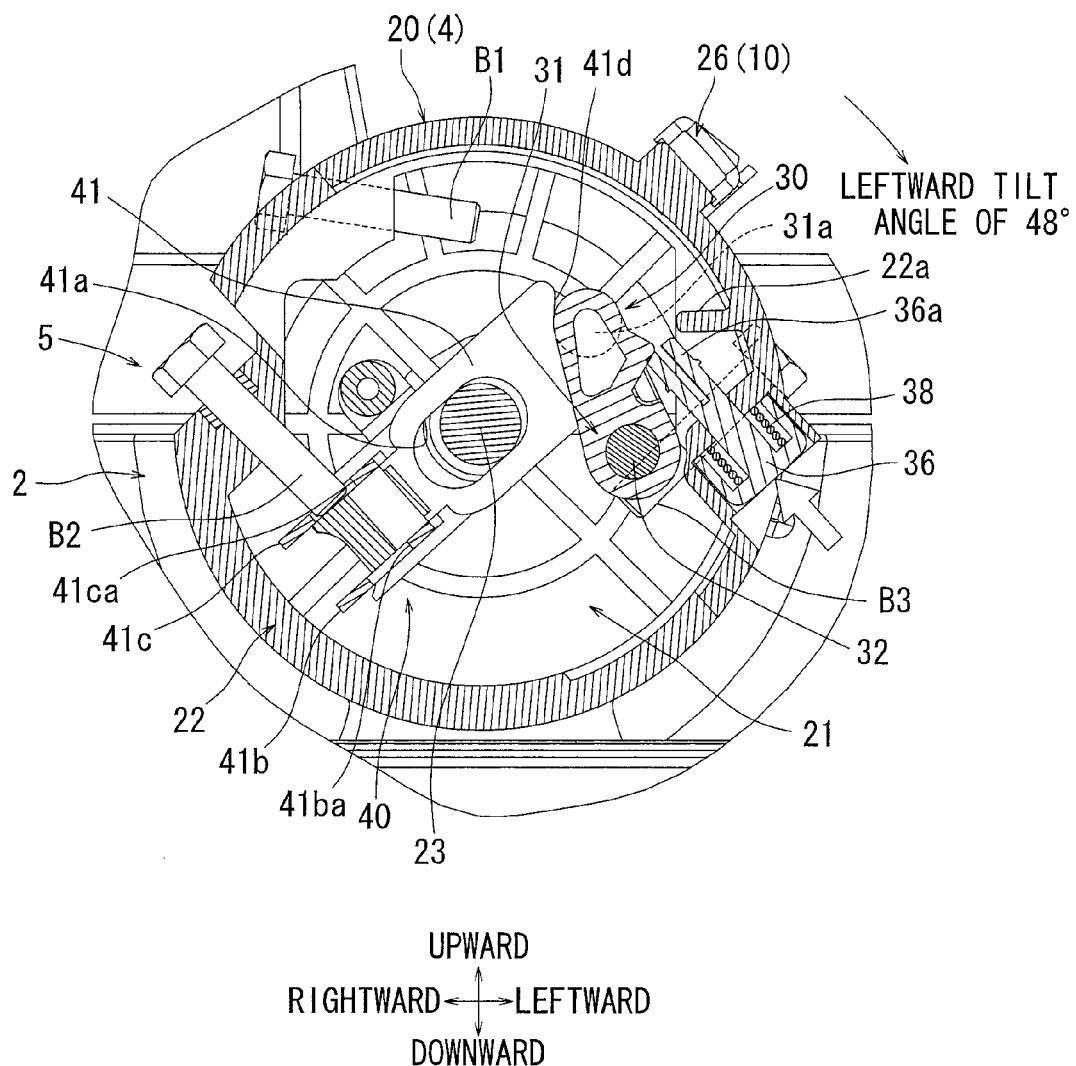
FIG. 11 is a view similar to FIG. 8 but showing the state where the cutting unit is positioned at a left 48° tilt position.

If the cutting unit 10 is tilted leftward while the releasing operation of the operation member 36 is performed to move the second switching member 41 to the lower second position, the second stopper ember B2 may directly abut the left side surface of the support base 22b after passing though the relief hole 41ca of the left switching tab 41c as shown in FIG. 11. In this way, the cutting unit 10 may be positioned at the left 48° tilt position. Also, FIG. 11 is different from FIG. 6 of the first embodiment only in that no positioning projection 42 is shown.

As described above, the positioning of the cutting unit 10 at the vertical position, the left 48° tilt position and the left 48° tilt position can be performed in the same manner as the cutting unit 10 incorporating the vertical position determining device 30 and the tilt position determining device 40 according to the first embodiment.

The second embodiment is different from the first embodiment in that the right switching tab 41b of the second switching member 41 may serve to determine the right tilt position if the cutting unit 10 is tilted rightward. In order to tilt the cutting unit 10 rightward, the fixing lever 28 may be loosened and then the releasing operation of the operation member 36 is performed. As the cutting unit 10 is tilted rightward while the operation member 36 is at the releasing position, the contact portion 31a of the first switching member 31 may pass through a space below the first stopper member B1, so that the cutting unit 10 can tilt further rightward.

Figure 12:
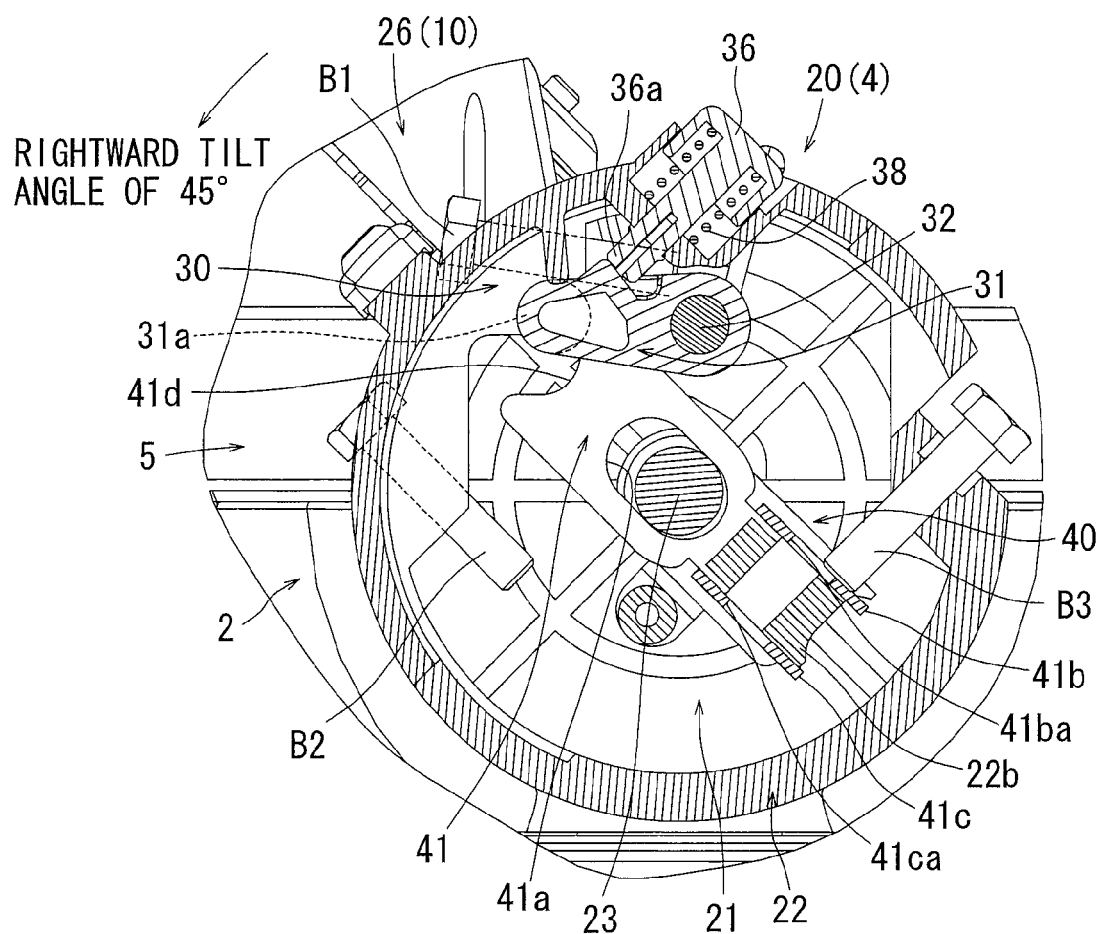
FIG. 12 is a view similar to FIG. 8 but showing the state where the cutting unit is positioned at a right 45° tilt position.
Figure 13:
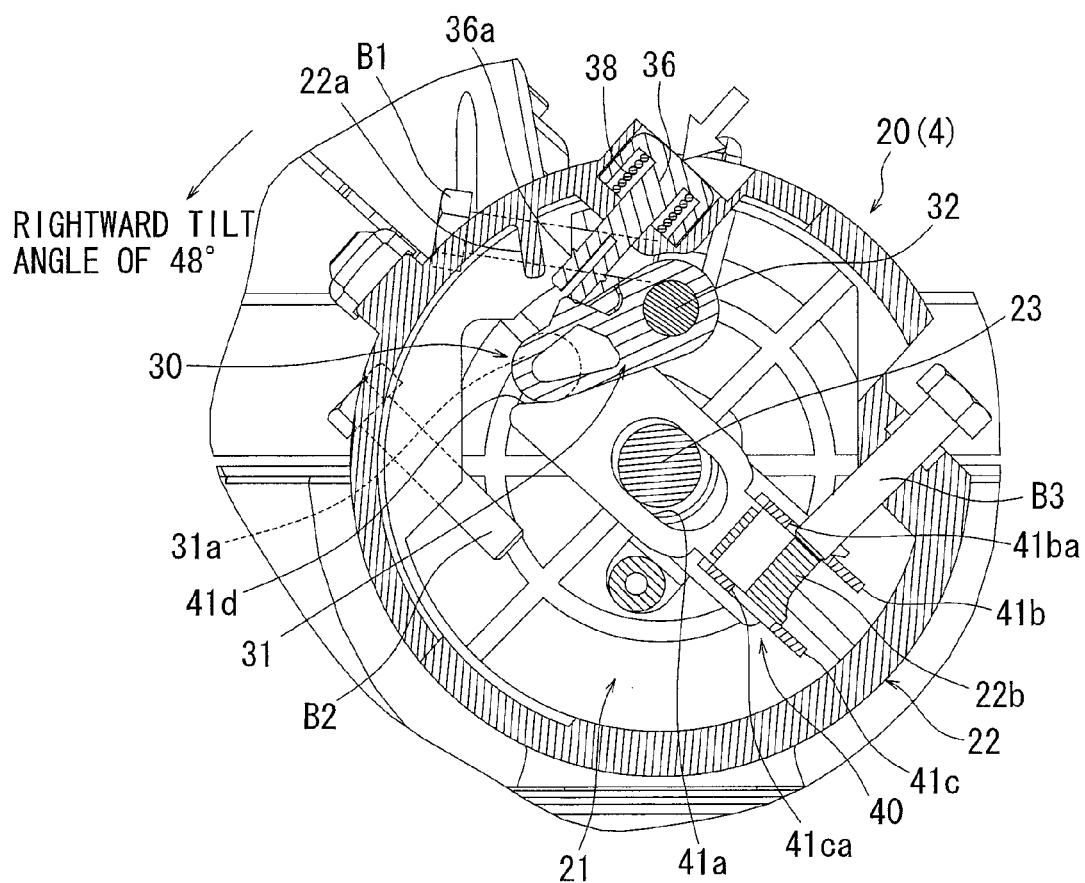
FIG. 13 is a view similar to FIG. 8 but showing the state where the cutting unit is positioned at a right 48° tilt position.

If the releasing operation of the operation member 36 is released after the contact portion 31a of the first switching member 31 has passed through the space below the first stopper member B1, the second switching member 41 may return to the upper first position. Therefore, when the cutting unit 10 has tilted rightward by an angle of 45°, the third stopper member B3 may abut the left switching tab 41b of the second switching member 41 as shown in FIG. 12. In this way, the cutting unit 10 can be positioned at the right 45° tilt position. After that, the fixing lever 28 may be tightened to fix the cutting unit 10 at the right 45° tilt position.

On the other hand, if the releasing operation of the operation member 36 is maintained even after the contact portion 31a of the first switching member 31 has passed through the space below the first stopper member B1, the second switching member 41 may be held at the lower second position. Therefore, as the cutting unit 10 is tilted rightward by an angle of 45°, the third stopper member B3 may not abut the left switching tab 41b of the second switching member 41 but may directly abut the left side surface of the support base 22b after passing through the relief hole 41ba. In this way, the cutting unit 10 can be positioned at the right 48° tilt position. After that, the fixing lever 28 may be tightened to fix the cutting unit 10 at the right 48° tilt position.

As described above, also in the case of the cutting machine 1 of the second embodiment, the cutting unit 10 can be selectively positioned at the left 45° tilt position or the left 48° tilt position depending on whether the operation member 36 operable for releasing the positioning of the cutting unit 10 at the vertical position is operated or not.

Thus, also in the second embodiment, the operation member 36 operable for releasing the positioning of the cutting unit 10 at the vertical position also has a function of switching the tilt angle. Therefore, in comparison to a construction requiring both an operation member for releasing the vertical position of the cutting unit as well as a separate member for switching the tilt angle, the operability of the cutting machine can be improved.

In addition, according to the second embodiment, the cutting unit 10 can be also selectively positioned at the right 45° tilt position or the right 48° tilt position depending on whether the operation member 36 is operated for releasing or not. Therefore, it is possible to select the tilt angle from different tilt angles that are large in number in comparison with the first embodiment. As a result, the usability of the cutting machine can be improved in this respect.

<Possible Modifications>

The above first and second embodiments may be modified in various ways. For example, the positioning projection (position determining member) 42 may be configured such that its position can be adjusted from the outside of the unit support 4 or can be detachable for replacement with another positioning projection or other positioning projections from the outside of the unit support 4. With this arrangement, the user can selectively use the function of positioning at the right 5° tilt position, the left 45° tilt position or the left 48° tilt position. In particular, it is possible to select the left tilt position from a large number of tilt positions. Therefore, the usability of the cutting machine can be further improved.

In the first embodiment, the cutting unit 10 can be positioned at a 0° position (vertical position), the left 45° tilt position, the left 48° tilt position and the right 5° tilt position in the first embodiment. In the second embodiment, the cutting unit 10 can be positioned at the 0° position, the left 45° tilt position, the left 48° tilt position, the right 45° tilt position and the right 48° tilt position. However, the tilt support 20 (including the vertical position determining mechanism 30 and the tilt position determining mechanism 40) can be used for positioning at least two different tilt positions on at least one of the right side and the left side. The tilt angles may be smaller or larger than those in the first and second embodiments.

Although the relief holes 41ba and 41ca are formed in the left and right switching tabs 41b and 41c of the second switching member 41 in order to enable switching between the 45° tilt position and the 48° tilt position, the relief holes 41ba and 41ca may be replaced with projections or like attached to or formed on the left and right switching tabs 41b and 41c for enabling switching between the 45° tilt position and the 48° tilt position.

Further, although the operation member 36 operable for releasing the positioning at the vertical position of the cutting unit 10 is configured as a push button, the operation member 36 may be configured to be positioned at a plurality of different positions along a linear moving path. This allows positioning of the cutting unit 10 at three different tilt positions. Such positions preferably include at least one the left side and one on the right side.

Further, the operation member 36 may be replaced with a rotary dial. In such a case, it may be possible to configure such that the first switching member can pivot together with the rotary dial. Together, they can cause, for example, linear movement of the second operation member so that a plurality of different tilt positions can be determined. Such positions preferably include at least one on the left side and one on the right side.

Furthermore, although the first switching member 31 pivots to move along a circular arc path and the second switching member 41 moves along a linear path in the above embodiments, it may be possible that the first switching member 31 moves along a linear path and the second switching member 41 moves along a circular arc path.

Furthermore, although the above embodiments have been described in connection with the cutting machine 1 having the cutting unit 10 that can slide in the forward and rearward directions for cutting the workpiece, the pivotal support 20 of the above teachings can also be applied to a cutting machine having a cutting unit that is simply moved vertically for cutting the workpiece. Also, with the pivotal support 20 incorporated into this kind of cutting machine, the same operations and advantages as in the first and second embodiments can be achieved.

What is claimed is:

1. A cutting machine comprising:
    a table for placing thereon a workpiece to be cut;
    a cutting unit having a cutter;
    a stopper device; and
    a position determining mechanism configured to cooperate with the stopper device for determining a position of the cutting unit at at least four set positions including a vertical position and at least three tilt positions that are not vertical where the cutting unit is tilted at different tilt angles in a left or right direction from the vertical position;
    wherein the position determining mechanism includes a single operation member movable in a linear direction and configured to switch the position of the cutting unit between two set positions of the at least four set positions according to a position of the operation member along the linear direction,
    wherein a plane of the cutter of the cutting unit is perpendicular to a top surface of the table when the cutting unit is in the vertical position,
    wherein the position determining mechanism further comprises:
        a first switching member movable between a position determining position for determining the vertical position of the cutting unit and a rest position spaced apart from the position determining position, wherein the operation member is operable to move the first switching member from the position determining position to the rest position; and
        a second switching member movable in response to the movement of the first switching member toward the rest position by a releasing operation of the operation member, so that the tilt angles to be determined can be switched;
    wherein the first switching member moves along a circular arc path by the releasing operation of the operation member, and the second switching member moves along a linear path by the movement of the first switching member; and
    wherein the operation member moves along a linear path.

2. The cutting machine according to claim 1, wherein the tilt angles of the cutting unit at the at least three tilt positions include at least two of the tilt angles being at either a left or right direction.

3. The cutting machine according to claim 1, wherein:
    the at least three tilt positions include a first tilt position and a second tilt position where the cutting unit is tilted at a first tilt angle and a second tilt angle, respectively;
    the stopper device comprises a stopper member;
    the first tilt position is determined through abutment between the stopper member and the second switching member;
    the position determining mechanism further includes a position determining member that is a separate member from the second switching member; and
    the second tilt position is determined through abutment between the stopper member and the position determining member.

4. The cutting machine according to claim 1, wherein the table is a rotary table, and the cutter is a rotary saw blade.

* * * * *